United States Patent
Leitner

(10) Patent No.: US 7,163,221 B2
(45) Date of Patent: Jan. 16, 2007

(54) RETRACTABLE VEHICLE STEP WITH ANTI-STRIKE/ANTI-PINCH SENSOR SYSTEM

(75) Inventor: Horst Leitner, Laguna Beach, CA (US)

(73) Assignee: 89908, Inc., Irvine, CA (US)

( * ) Notice: Subject to any disclaimer, the term of this patent is extended or adjusted under 35 U.S.C. 154(b) by 0 days.

(21) Appl. No.: 10/977,321

(22) Filed: Oct. 29, 2004

(65) Prior Publication Data

US 2005/0173886 A1    Aug. 11, 2005

Related U.S. Application Data

(60) Provisional application No. 60/516,009, filed on Oct. 31, 2003.

(51) Int. Cl.
*B60R 3/00* (2006.01)

(52) U.S. Cl. .................. 280/166; 105/444; 105/447; 182/18; 182/88; 182/127

(58) Field of Classification Search ................ 280/166, 280/163, 169, 727; 182/88, 91, 127, 18, 182/84; 414/558; 105/443, 444, 445, 447, 105/448; 296/62
See application file for complete search history.

(56) References Cited

U.S. PATENT DOCUMENTS

| | | | | |
|---|---|---|---|---|
| 5,547,040 | A * | 8/1996 | Hanser et al. ................ 182/88 |
| 6,179,312 | B1 * | 1/2001 | Paschke et al. ............. 280/166 |
| 6,264,222 | B1 * | 7/2001 | Johnston et al. ............ 280/166 |
| 6,641,158 | B1 * | 11/2003 | Leitner ....................... 280/166 |
| 6,746,033 | B1 * | 6/2004 | McDaniel ................... 280/166 |
| 6,812,466 | B1 * | 11/2004 | O'Connor et al. ......... 250/341.1 |
| 6,830,257 | B1 * | 12/2004 | Leitner ....................... 280/166 |
| 6,834,875 | B1 * | 12/2004 | Leitner et al. .............. 280/166 |
| 6,912,912 | B1 | 7/2005 | Reichinger et al. |
| 6,938,909 | B1 * | 9/2005 | Leitner ....................... 280/166 |
| 6,942,233 | B1 * | 9/2005 | Leitner et al. .............. 280/166 |
| 2005/0087951 | A1 | 4/2005 | Leitner |
| 2005/0151340 | A1 * | 7/2005 | Leitner ....................... 280/166 |
| 2005/0173886 | A1 * | 8/2005 | Leitner ....................... 280/166 |
| 2005/0179227 | A1 * | 8/2005 | Leitner ....................... 280/163 |

FOREIGN PATENT DOCUMENTS

| | | |
|---|---|---|
| EP | 0 066 493 | 12/1982 |
| GB | 2 201 511 | 9/1988 |
| GB | 2 288 014 | 10/1995 |
| WO | WO 03/069294 | 8/2003 |

OTHER PUBLICATIONS

G. Kodi, *A New Optical Waveguide Pressure Sensor using Evanescent Field*, Leoni AG, Central Research and Development.

* cited by examiner

*Primary Examiner*—J. Allen Shriver
(74) *Attorney, Agent, or Firm*—Knobbe, Martens, Olson & Bear, LLP

(57) ABSTRACT

A retractable step assist for a vehicle comprises a step, an actuator, an optical fiber sensor, and a safety. The step is movable between a retracted position and a deployed position that is downward and outboard from the retracted position. The actuator is mechanically connected to the step to position the step. The optical fiber sensor has an output that varies when pressure is applied to the optical fiber sensor. The safety is triggered by this output from the optical fiber sensor. The safety is configured to terminate retraction of the step when the optical fiber sensor senses pressure from an object pinched by the step deck.

48 Claims, 14 Drawing Sheets

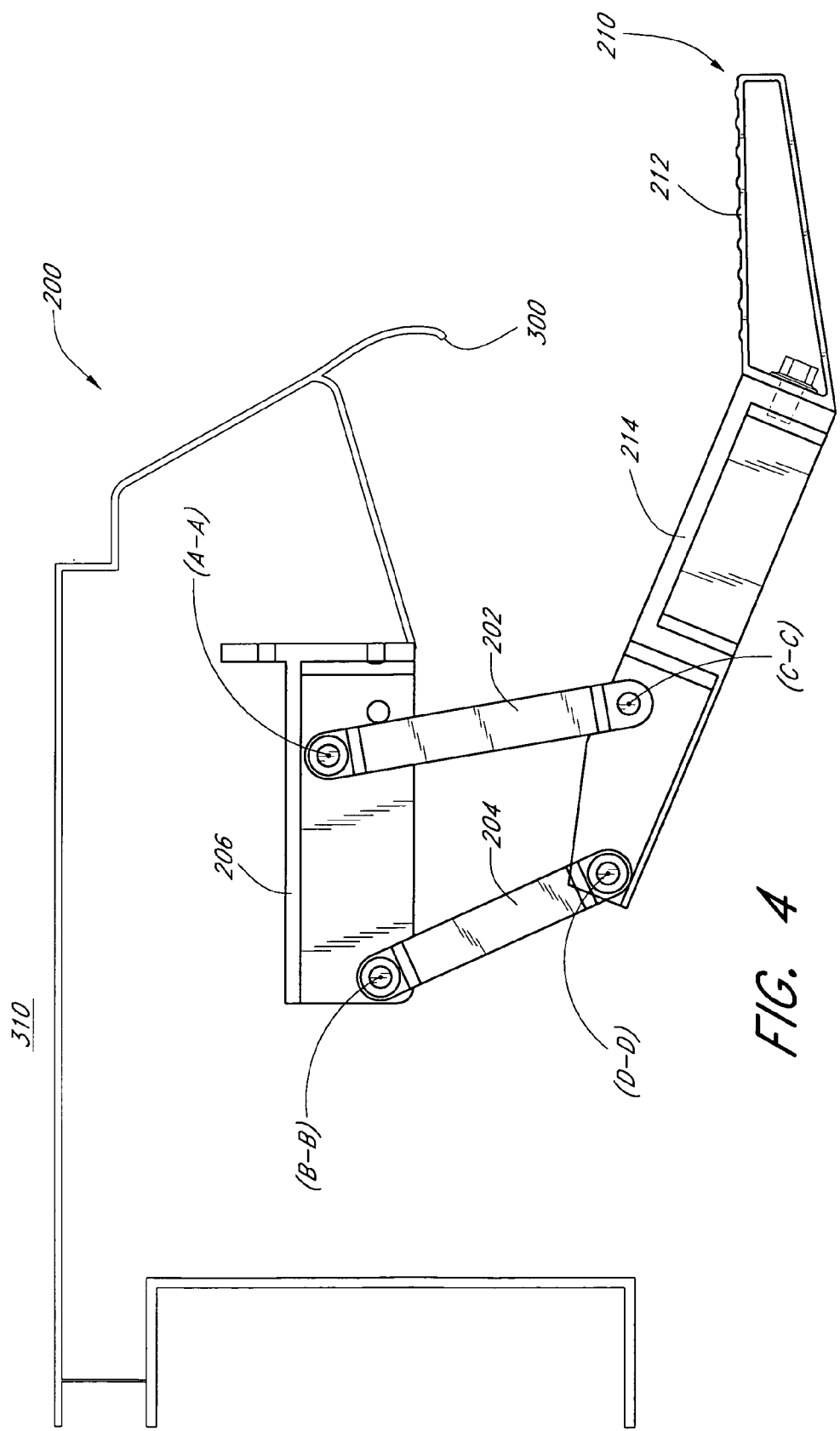

RETRACTABLE VEHICLE STEP WITH ANTI-STRIKE/ANTI-PINCH SENSOR SYSTEM

RELATED APPLICATIONS

This application claims the benefit of U.S. Provisional Application No. 60/516,009, filed Oct. 31, 2003, titled RETRACTABLE VEHICLE STEP WITH ANTISTRIKE/ANTI-PINCH SENSOR SYSTEM, which is incorporated herein by reference in its entirety.

BACKGROUND OF THE INVENTION

1. Field of the Invention

This invention relates generally to a stepping assist for motor vehicles. In particular, the invention relates to a retractable vehicle step which is movable between a retracted or storage position and an extended position in which it functions as a step assist into the vehicle.

2. Description of the Related Art

It is commonly known to add a running board or similar fixed stepping assist to the side of a motor vehicle, especially to a vehicle with a relatively high ground clearance. However, these fixed running boards and other stepping assists have had several drawbacks. First, a fixed running board is often too high to act as a practical stepping assist and is therefore not very effective in reducing the initial step height for the vehicle user. In addition, when using a relatively high running board, the user is likely to hit his or her head while climbing into the vehicle cab. Furthermore, a fixed running board often extends a significant distance from the side of the vehicle, and can be a source of dirt or grime that rubs onto the user's pants or other clothing as the user steps out of the vehicle onto the ground surface. Such a fixed running board is also frequently struck when the owner of an adjacent parked vehicle opens his door. Finally, a fixed running board or step reduces the ground clearance of a vehicle, and can often be damaged or torn off entirely when the vehicle is used for offroad driving.

Accordingly, a vehicle step which overcomes the above-stated problems is desired.

SUMMARY OF THE INVENTION

One embodiment of the invention comprises a retractable step assist for a vehicle comprising a step member, an extendable support assembly, an electrically activated actuator, an optical fiber, a light source, a light sensitive optical detector, and an electrically activated safety. The step member has a step deck with an upper stepping surface. The step deck is movable between a retracted position and a deployed position downward and outboard from the retracted position. The extendable support assembly is connectable with respect to an underside of the vehicle so as to extend the step deck downward and outward from the underside of the vehicle in the deployed position. The electrically activated actuator is mechanically connected to the extendible support assembly to automatically position the extendible support assembly and the step deck. The optical fiber comprises an inner core and an outer cladding. The outer cladding at least partially surrounds the inner core. The optical fiber has transmission properties that vary when pressure is applied to the optical fiber. The optical fiber is disposable on a lower body portion of the vehicle. The light source has an optical output optically connected to the optical fiber so as to couple light output by the light source into the core of the optical fiber such that the light propagates through the optical fiber. The light sensitive optical detector is optically coupled to the core of the optical fiber to measure the intensity of the light from the light source propagating through the optical fiber. The intensity measured by the optical detector varies when pressure is applied to the optical fiber. The optical detector has an electrical output dependent on the measured intensity and indicative of the pressure applied. The electrically activated safety is electrically connected to the electrical output of the optical detector. The electrically activated safety terminates retracting motion of the step member when the optical fiber senses pressure from an object pinched between the step deck and the lower body portion.

Another embodiment of the invention comprises a retractable vehicle step assist comprising a first support arm, a second support arm, a step member, a fiber optic sensor, and a safety system. The first support arm and the second support arm are connectable with respect to an underside of a vehicle so as to be pivotable about a first axis oriented generally parallel to the ground and a second axis oriented generally parallel to the ground, respectively. The step member has an upper stepping surface. The first support arm and the second support arm are connected to the step member so that the first support arm and the second support arm are pivotable with respect to the step member about a third axis and a fourth axis, respectively. The fourth axis is located inboard from the third axis. The first support arm and the second support arm allows the step member to move between a retracted position and a deployed position downward and outboard from the retracted position. At least a portion of the upper stepping surface moves upward as the step member moves from the retracted position to the deployed position.

The fiber optic sensor is sensitive to pressure. The fiber optic sensor is at least partly disposable in a location of the vehicle upward and inboard from the extended position such that an object pinched by the retracting step member is sensed by the fiber optic sensor. The fiber optic sensor comprises an optical fiber line, a light source, and a light sensitive optical detector. The optical fiber line comprises a core and a cladding. The optical fiber has a transmission loss increasing with pressure applied to the optical fiber. The light source is optically coupled to the optical fiber core to introduce light into the optical fiber. The light inserted in the core propagates along the optical fiber. The light sensitive optical detector is optically coupled to the optical fiber core to sense the light propagating within the core of the optical fiber. The light sensitive optical detector has an electrical output port outputting a signal determined in part by the optical transmission loss of the optical fiber.

The safety system comprises an electrical switch having an electrical input port connected to the electrical output port of the light sensitive optical detector of the fiber optic sensor. The safety system terminates retraction of the step member when an object is pinched by the retracting step member causing the object to apply pressure to the fiber optic line that introduces transmission loss sensed by the light sensitive optical detector and communicated electronically to the safety system.

Another embodiment of the invention comprises a retractable step assist for a vehicle comprising a step member, an extendable support assembly, an actuator, an optical fiber, a light source, a light sensitive optical detector, and a safety. The step member has a step deck with an upper stepping surface. The step deck is movable between a retracted position and a deployed position downward and outboard from the retracted position. The extendable support assembly is connectable with respect to an underside of the vehicles so as to extend said step deck downward and outward from the underside of the vehicle in the deployed position. The actuator is mechanically connected to the extendible support assembly to position the extendible support assembly and the step deck. The optical fiber comprises an inner core and an outer cladding at least partially surrounding the inner core. The optical fiber has optical properties that vary when pressure is applied to the optical fiber. The optical fiber is disposable on a lower body portion of the vehicle. The light source has an optical output optically connected to the optical fiber so as to couple an optical signal into the core of the optical fiber such that the optical signal propagates through the optical fiber. The light sensitive optical detector is optically coupled to the core of the optical fiber to sensing the optical signal propagating through the optical fiber. The optical signal measured by the optical detector varies when pressure is applied to the optical fiber. The optical detector has an output that is dependent on the optical signal measured and is indicative of the pressure applied. The safety is triggered by a signal from the optical detector. The safety is configured to terminate retraction of the step member when the optical fiber senses pressure from an object pinched between the step deck and the lower body portion.

Another embodiment of the invention comprises a method of reducing injury caused by retraction of retractable step in a retractable vehicle step assist. In this method, a fiber optic is disposed with respect to the retracting step to be at least partially compressed when an object is contacted by retraction of the retractable step in a vehicle step assist. The fiber optic has optical properties that are altered when the fiber optic is compressed. Light is propagated through the optical fiber. The light propagated through the optical fiber is detected. Whether the fiber optic is compressed is determined based on the variation in the optical properties of the fiber optic. Retraction of the retractable step is terminated upon compression of the fiber optic.

Another embodiment of the invention comprises a retractable step assist for a vehicle comprising a step member, an extendable support assembly, an actuator, an optical fiber, a light source, a light sensitive optical detector, and a safety. The step member has a step deck with an upper stepping surface. The step deck is movable between a retracted position and a deployed position downward and outboard from the retracted position. The extendable support assembly is connectable with respect to an underside of the vehicles so as to extend said step deck downward and outward from the underside of the vehicle in the deployed position. The actuator is mechanically connected to the extendible support assembly to position the extendible support assembly and the step deck. The optical fiber comprises an inner core and an outer cladding at least partially surrounding the inner core. The optical fiber has optical properties that vary when pressure is applied to the optical fiber. The optical fiber is disposable on a lower body portion of the vehicle. The light source has an optical output optically connected to the optical fiber so as to couple an optical signal into the core of the optical fiber such that the optical signal propagates through the optical fiber. The light sensitive optical detector is optically coupled to the core of the optical fiber to sensing the optical signal propagating through the optical fiber. The optical signal measured by the optical detector varies when pressure is applied to the optical fiber. The optical detector has an output that is dependent on the optical signal measured and is indicative of the pressure applied. The safety is triggered by a signal from the optical detector. The safety is configured to terminate retraction of the step member when the optical fiber senses pressure from an object pinched between the step deck and the lower body portion.

Another embodiment of the invention comprises a retractable step assist for a vehicle comprising a step, an actuator, an optical fiber sensor, and a safety. The step is movable between a retracted position and a deployed position that is downward and outboard from the retracted position. The actuator is mechanically connected to the step to position the step. The optical fiber sensor has an output that varies when pressure is applied to the optical fiber sensor. The safety is triggered by the output from the optical fiber sensor. The safety is configured to terminate retraction of the step when the optical fiber sensor senses pressure from an object pinched by the step.

Another embodiment of the invention comprises a retractable step assist for a vehicle comprising a step member, an extendable support assembly, an electrically activated actuator, an optical fiber sensor, and an electrically activated safety. The step member has a step deck with an upper stepping surface. The step deck is movable between a retracted position and a deployed position downward and outboard from the retracted position. The extendable support assembly is connectable with respect to an underside of the vehicle so as to extend the step deck downward and outward from the underside of the vehicle in the deployed position. The electrically activated actuator is mechanically connected to the extendible support assembly to automatically position the extendible support assembly and the step deck. The optical fiber sensor is disposed as least in part on a lower body portion of the vehicle. The optical fiber sensor outputs a signal that varies when pressure is applied to the optical fiber sensor. The optical fiber sensor is configured to activate the electrically activated actuator which terminates retracting motion of the step member when the optical fiber sensor senses pressure from an object pinched between the step deck and the lower body portion.

Another embodiment of the invention comprises a method of reducing injury caused by retraction of retractable step in a retractable vehicle step assist. In this method, a fiber optic sensor is disposed with respect to the retracting step to be at least partially compressed when an object is contacted by retraction of the retractable step in a vehicle step assist. Whether the fiber optic sensor is compressed is determined based on the output from the fiber optic sensor. Retraction of the retractable step is terminated upon compression of the fiber optic sensor.

BRIEF DESCRIPTION OF THE DRAWINGS

FIG. 4 is a side view of one embodiment of a retractable vehicle step.

DETAILED DESCRIPTION OF THE PREFERRED EMBODIMENT

Figure 1:
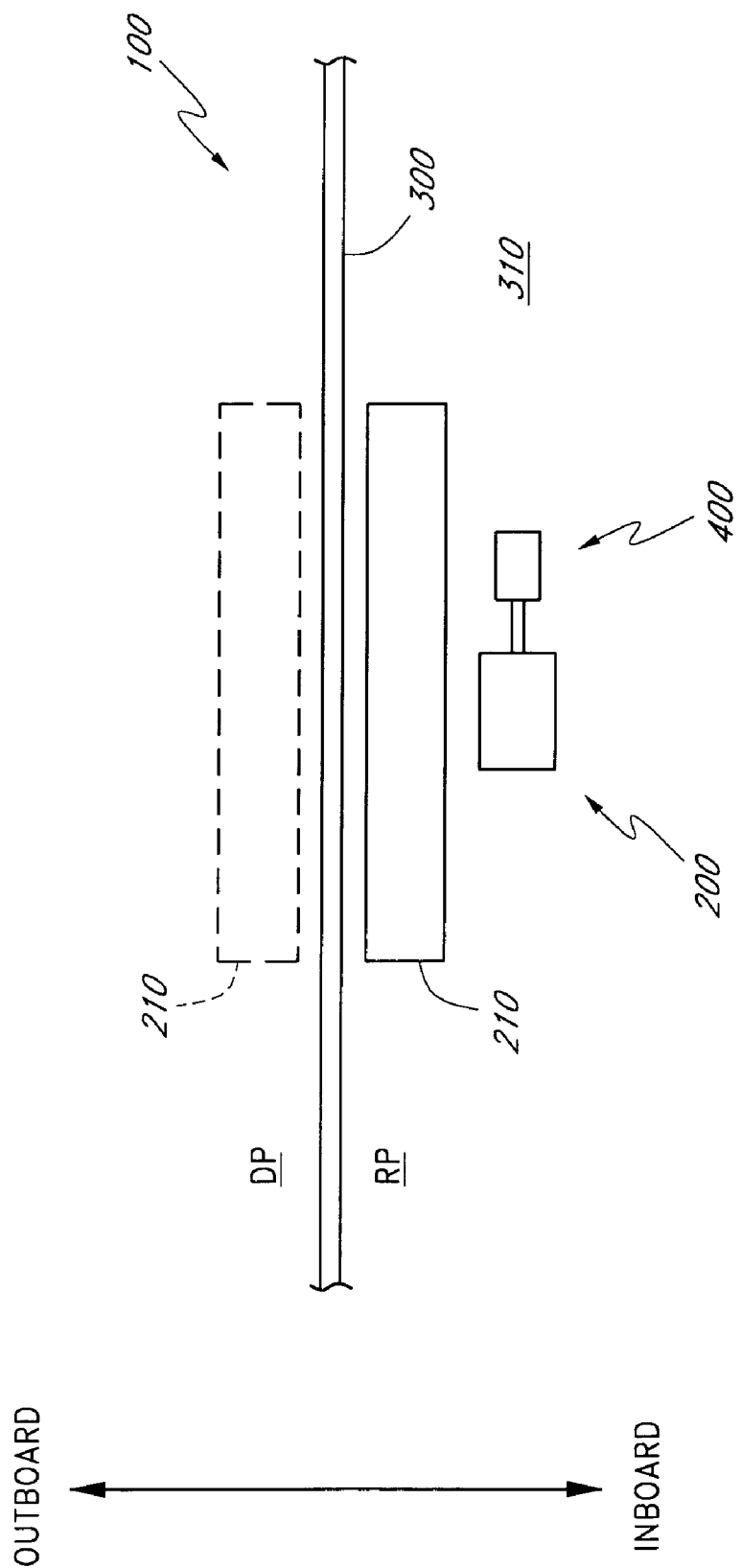
FIG. 1 is a schematic plan view of a retractable vehicle step system.
Figure 3:
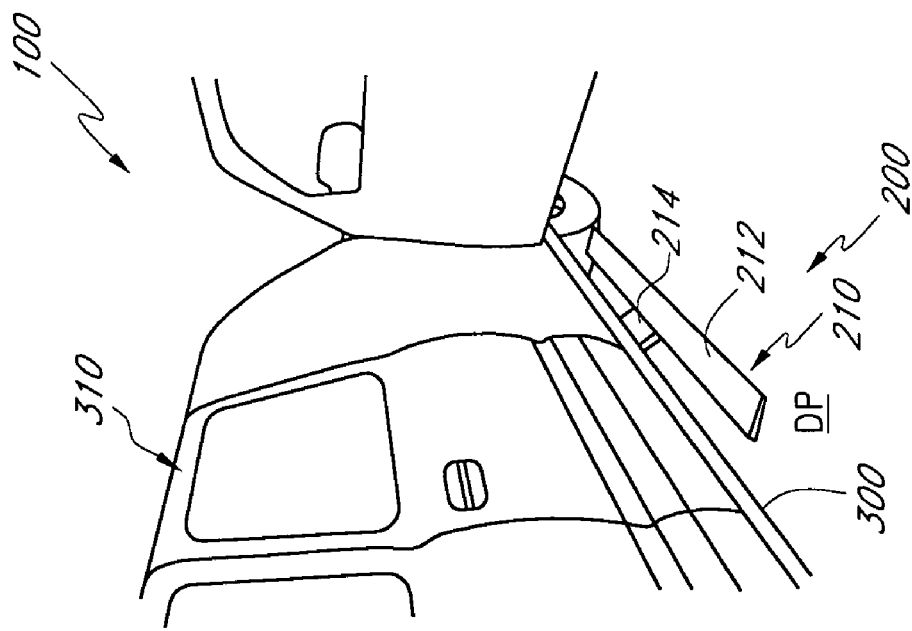
FIG. 3 is a perspective view of the retractable vehicle step system of FIG. 1, with the step member in the deployed position.
Figure 2:
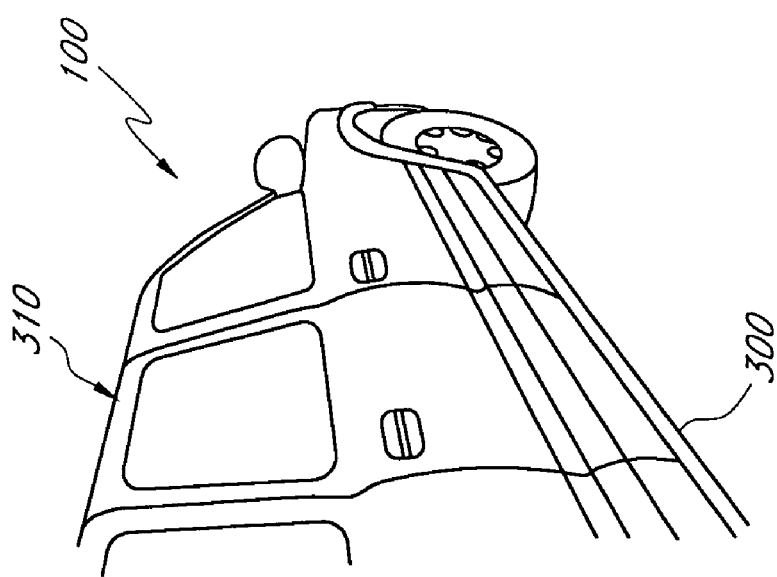
FIG. 2 is a perspective view of the retractable vehicle step system of FIG. 1, with the step member in the retracted position.

FIGS. 1–3 depict one embodiment of a retractable vehicle step system 100, which may generally comprise a retractable vehicle step 200 mounted adjacent an outboard edge 300 of a vehicle 310. A drive system 400 may be connected to the vehicle step 200 to provide powered movement of a step member 210 of the vehicle step 200 between a retracted position RP and a deployed position DP. In the depicted embodiment, the step member 210 is movable, under power delivered by the drive system 400, generally along an inboard-outboard direction between the retracted position RP, in which the step member 210 is partially or completely inboard of the outboard edge, and the deployed position DP, in which the step member 210 is partially or completely outboard of the edge 300. Accordingly, the step member 210 may serve as a step assist for entering the vehicle when in the deployed position DP.

The outboard edge 300 may comprise, for example, a lower outboard edge of the vehicle 310, such as a lower side edge, lower rear edge, or lower forward edge, depending on the mounting location of the retractable vehicle step 200. Where the edge 300 comprises a lower side edge, the edge 300 is oriented generally parallel to a direction of travel of the vehicle 310, and the inboard-outboard direction depicted in FIG. 1 is oriented generally perpendicular to the direction of travel. The direction of travel is typically parallel to the longitudinal axis of the vehicle 310. Where the edge 300 comprises a lower rear edge or lower forward edge of the vehicle 310, the edge 300 is oriented generally perpendicular to the direction of travel of the vehicle, and the inboard-outboard direction depicted in FIG. 1 is oriented generally parallel to the direction of travel.

The retractable vehicle step 200 may comprise any suitable retractable vehicle step mechanism, of which there are many presently known in the relevant arts. Of course, any suitable later-developed mechanism may also be employed as the retractable vehicle step 200. In some embodiments, the retractable vehicle step 200 may comprise any of the retractable-step mechanisms disclosed in U.S. Patent Application Publication No. US 2002/0113400 A1 (application Ser. No. 09/817,897), published Aug. 22, 2002, titled RETRACTABLE VEHICLE STEP; or U.S. Patent Application Publication No. US 2003/0184040 A1 (application Ser. No. 10/274,418), published Oct. 2, 2003, titled RETRACTABLE VEHICLE STEP. The entire contents of each of the above-mentioned patent applications and publications are hereby incorporated by reference herein and made a part of this specification.

FIG. 4 depicts one mechanism that may be employed as the retractable vehicle step 200. This embodiment of the retractable vehicle step 200 includes a first arm 202 and a second arm 204, each of which is pivotably connectable via, e.g., a frame 206, with respect to the underside of the vehicle 310. (Alternatively, the first and second arms 202, 204 may be directly coupled to the underside of the vehicle 310.) The first and second arms 202, 204 are therefore pivotable with respect to the underside of the vehicle about generally parallel first and second axes A—A, B—B, respectively. Each of the first and second axes A—A, B—B is oriented generally parallel to the ground. The step member 210, which may comprise a stepping deck 212 rigidly connected to a support bracket 214, is connected to the first and second arms 202, 204 so as to be rotatable about third and fourth axes C—C, D—D, respectively. Thus, upon rotation of the first and second arms 202, 204 about the first and second axes A—A, B—B, the step member 210 moves between the retracted position RP and the deployed position DP.

It should be noted that the designation of the outboard arm as the "first arm" and the inboard arm as the "second arm," and the designation of the various axes as the first through fourth axes is for convenience only, and any of the arms or axes may be considered a first arm, second arm, first axis, second axis, etc. where these terms are used in the appended claims.

FIGS. 5–10 depict one embodiment of a drive system 400. The depicted drive system generally comprises a motor assembly 402 which drives a pinion gear 404, which in turn meshes with an output gear 406. The output gear 406 is mounted on and turns an output shaft 408, which forms a drive end 410 for connecting the drive system 400 to the retractable vehicle step 200. The pinion gear 404 rotates about a pinion axis F—F and the output gear 406 and output shaft 408 rotate about an output axis G—G.

In some embodiments, the motor assembly 402 comprises an electric motor 412 which in turn comprises an armature (see FIG. 12) which, when energized, rotates about an armature axis E—E. In certain such embodiments, the internal gearing of the motor assembly 402 is configured to orient a drive shaft 414 (as well as the pinion axis F—F, about which the drive shaft 414 rotates as well) of the motor assembly 402 generally perpendicular to the armature axis E—E. One suitable type of electric motor assembly 402 is a standard automotive window-lift motor, such as those available from Siemens AG of Munich, Germany. Such motors are particularly useful because of their ready availability, low cost, low weight and high reliability. Alternatively, any other suitable type of electric motor may be employed, or a pneumatic or hydraulic motor, or a hand crank may be employed to provide power for the drive system 400.

Figure 11:
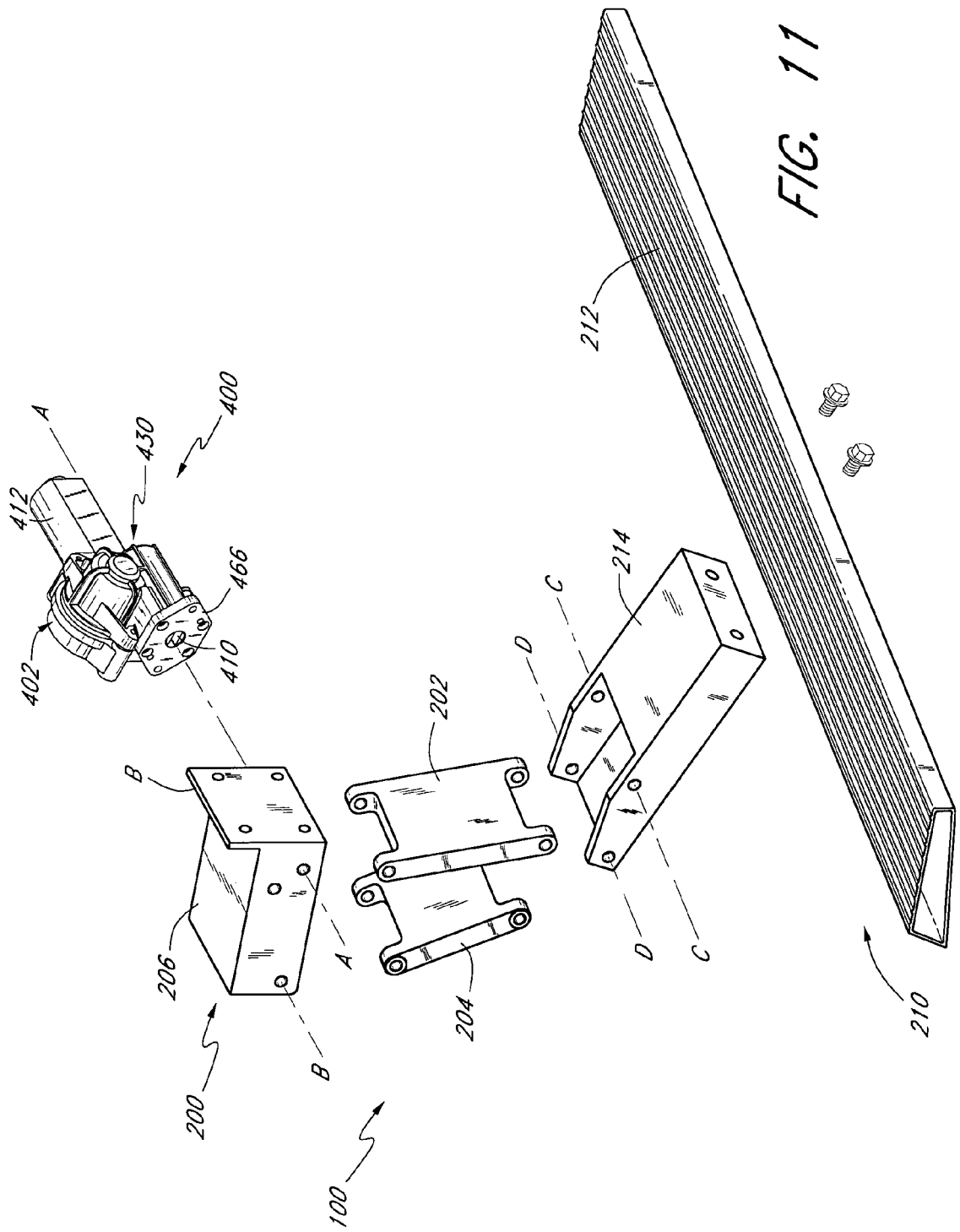
FIG. 11 is an exploded view of the retractable vehicle step of FIG. 4, connected to the drive system of FIG. 5.

Whether the motor assembly 402 comprises a window-lift motor as discussed above, or some other type of electric or non-electric motor, the speed of the motor 412 itself (e.g. the armature speed where an electric motor is employed) may, in various embodiments, be (i) about 4,500–6,000 RPM, or about 5,000–5,500 RPM, or about 5,300 RPM when unloaded (e.g., with no drive load coupled to the drive shaft 414); (ii) about 3,500–5,500 RPM, or 4,000–5,000 RPM, or about 4,500 RPM when deploying a retractable vehicle step (e.g. the step 200 depicted herein) connected with respect to the output gear 406 or output shaft 408; and/or (iii) about 2,500–4,500 RPM, or about 3,000–4,000 RPM, or about 3,500 RPM when retracting such a retractable vehicle step connected with respect to the output gear 406 or output shaft 408. Similarly, the speed of the drive shaft 414 may, in various embodiments, be (i) about 40–160 RPM, or about 75–125 RPM, or about 90 RPM when unloaded (e.g., with no drive load coupled to the drive shaft 414); (ii) about 30–150 RPM, or about 60–120 RPM, or about 75 RPM when deploying a retractable vehicle step (e.g. the step 200 depicted herein) connected with respect to the output gear 406 or output shaft 408; and/or (iii) about 15–140 RPM, or about 40–120 RPM, or about 60 RPM when retracting such a retractable vehicle step connected with respect to the output gear 406 or output shaft 408.

Where the drive system 400 is employed with a retractable vehicle step similar to that shown in FIG. 4, the output shaft 408 may be connected to the upper end of the first arm 202 (see FIG. 11) or the second arm 204, to drive the arm under power delivered by the motor assembly 402, and cause it to rotate about the first axis A—A or second axis B—B, thereby moving the step member 210 between the retracted and deployed positions. With the drive system 400 so connected to the retractable vehicle step 200, the output axis G—G will be substantially coincident with the first axis A—A or the second axis B—B, depending on whether the first arm 202 or the second arm 204 is driven by the drive system.

Figure 5:
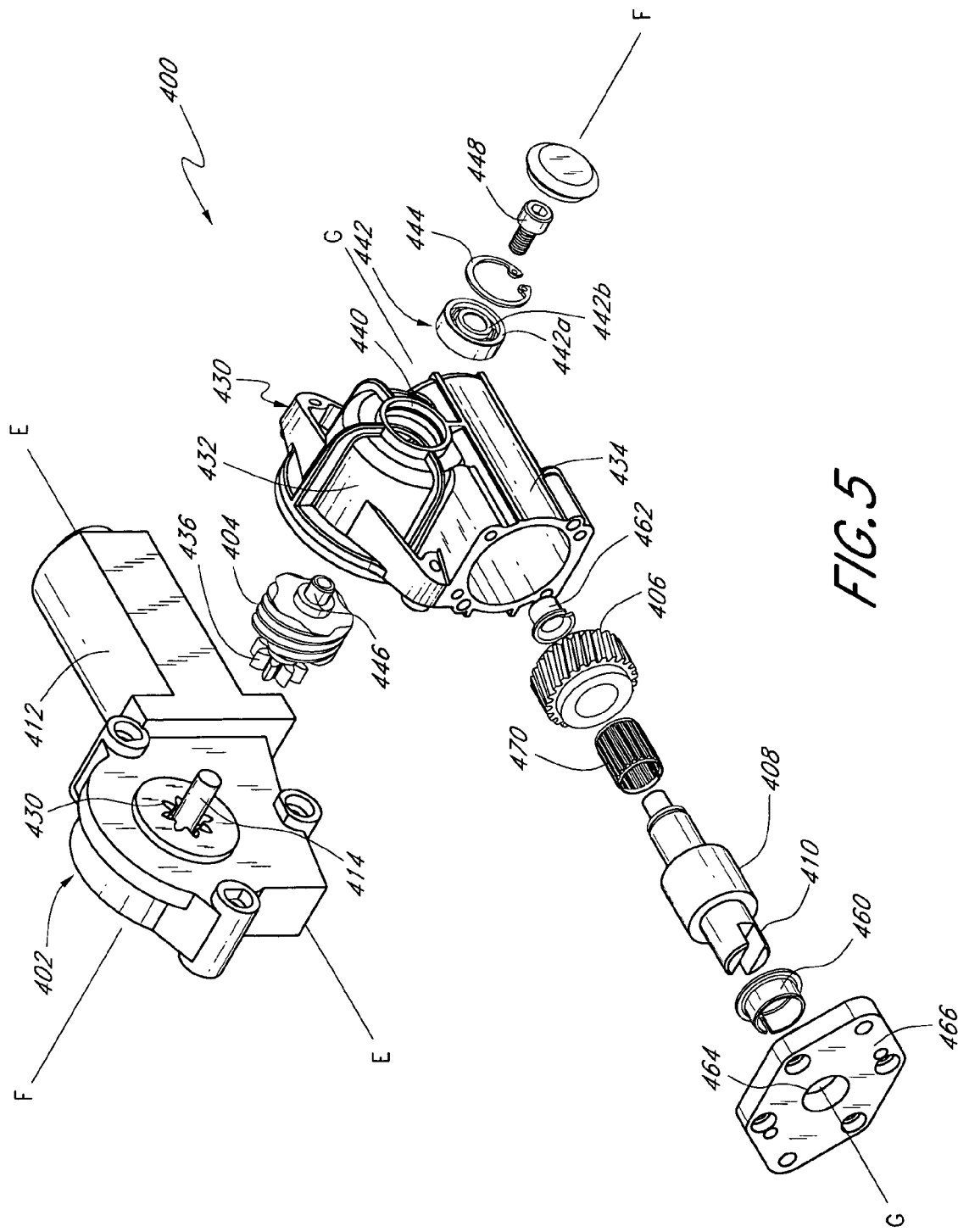
FIG. 5 is an exploded perspective view of one embodiment of a drive system for use with the step system of FIGS. 1–3 and/or the retractable vehicle step of FIG. 4.
Figure 6:
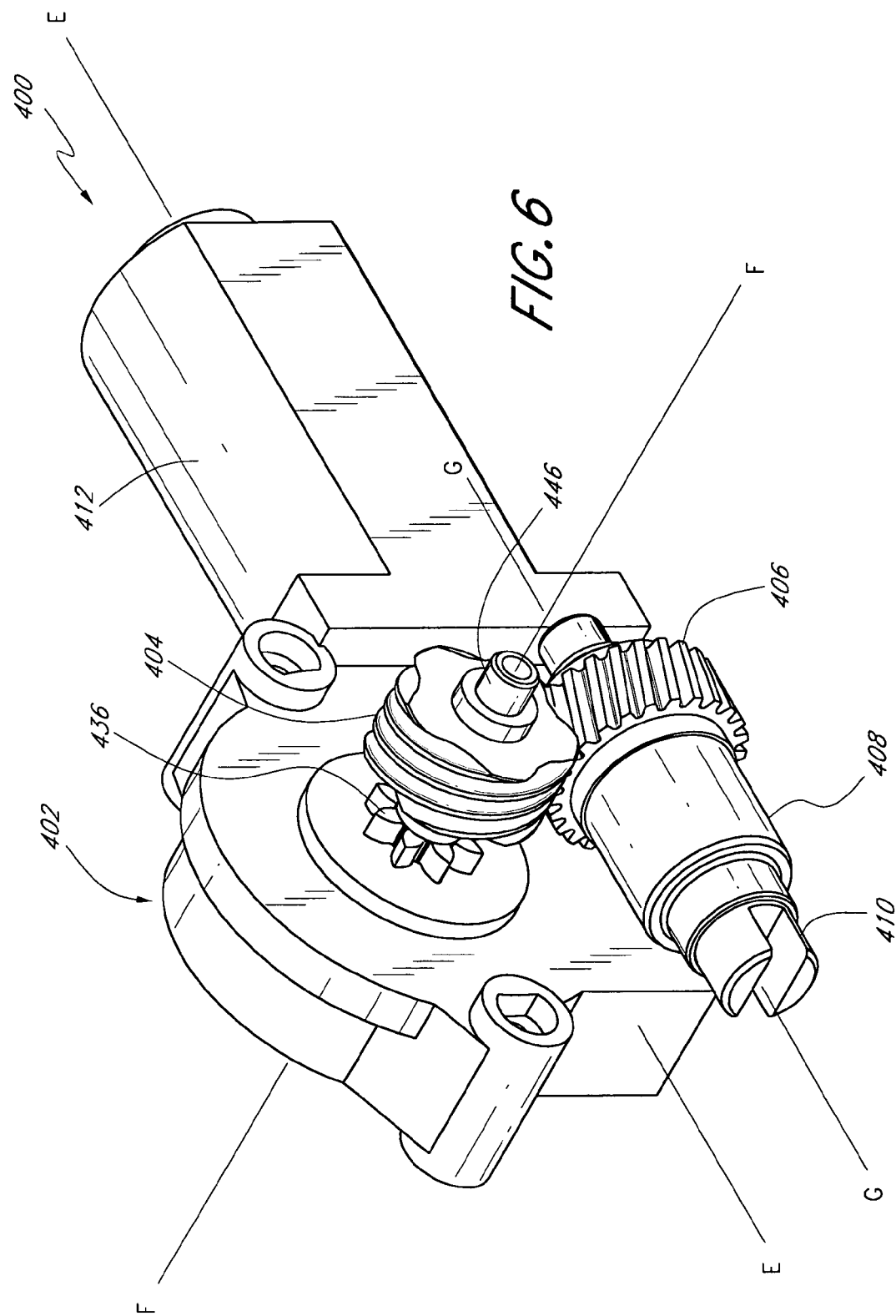
FIG. 6 is a second perspective view of the drive system of FIG. 5, with the gearbox thereof removed for clarity.
Figure 7:
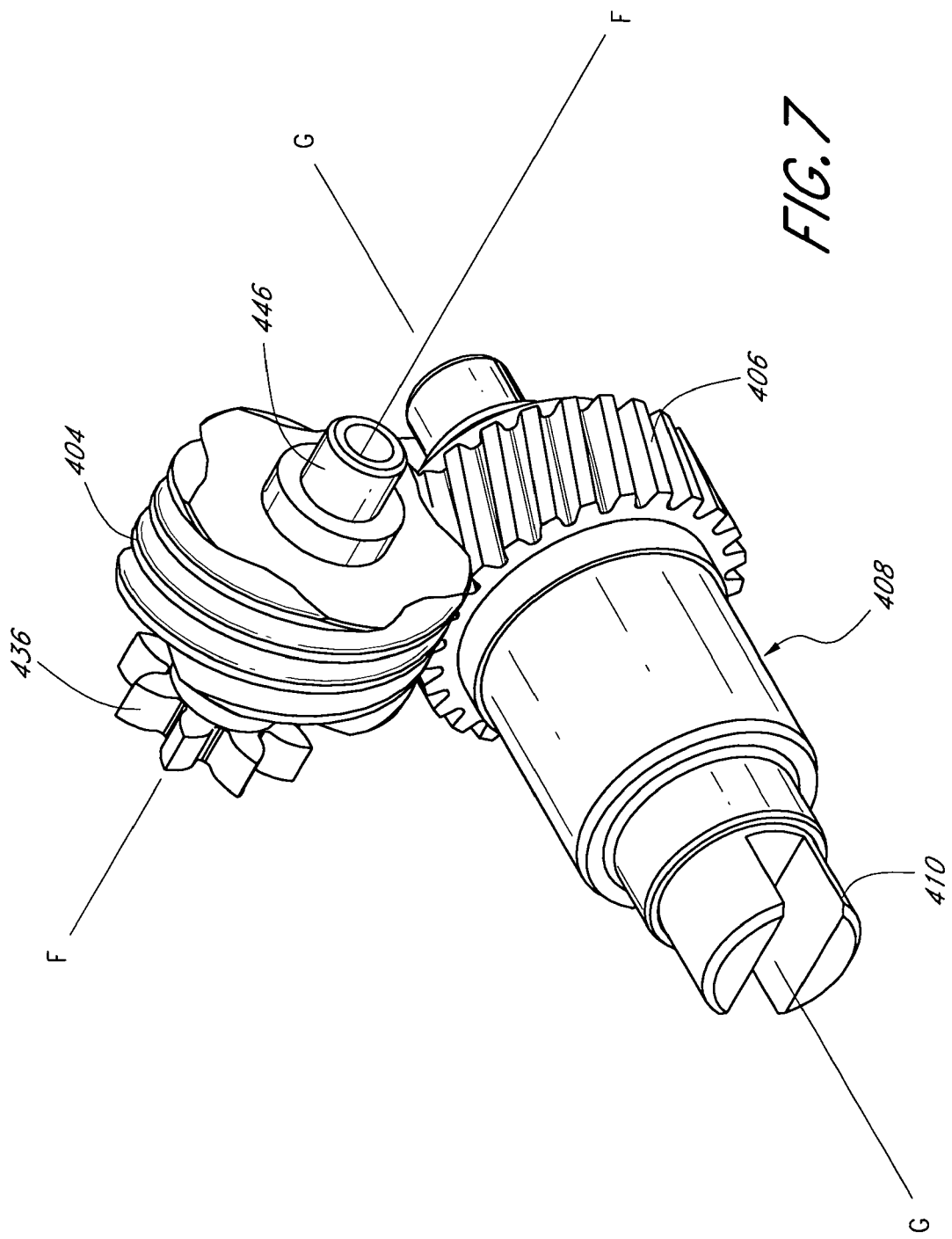
FIG. 7 is a detail view of the drive system of FIG. 5.

Moreover, where the drive system 400 is so connected to a retractable vehicle step 200 of the type shown in FIG. 4, and a motor assembly 402 of the type shown in FIG. 5 is employed, the armature axis E—E will extend generally parallel to the outboard edge 300 of the vehicle. This arrangement is advantageous because in some vehicles more room is available for mounting the retractable vehicle step in the lateral (i.e. generally parallel to the outboard edge 300) direction than in the inboard-outboard direction, or in the vertical direction. Accordingly, packaging is improved by mounting the motor assembly 402 such that its armature axis E—E (or, more generally, the long/largest dimension of the motor assembly 402) extends laterally (rather than inboard) from the retractable vehicle step 200.

In some embodiments, the pinion gear 404 and output gear 406 each comprise helical gears and form a right-angle helical drive. In certain such embodiments, the pinion gear 404 may comprise a 5-tooth helical gear with teeth arranged at a 75-degree helix angle, and/or the output gear 406 may comprise 25-tooth helical gear with a helix angle of 15 degrees. This arrangement facilitates a relatively high gear reduction (5:1) while permitting the gears 404, 406 to be of comparable outside diameter (the larger of the two preferably having an outside diameter no more than about 3.0, 2.0, 1.5, 1.2 or 1.1 times that of the smaller). In turn, the output gear 406 may be reduced in size, while preserving a relatively high gear reduction, without requiring an overly small (and weak) pinion gear 404. Accordingly, in various embodiments, the output gear has outside diameters of less than about 50 mm, less than about 40 mm, or less than about 35 mm. In still another embodiment, the output gear has an outside diameter of about 35 mm.

Use of a relatively small output gear 406 is beneficial in terms of packaging of the drive system 400, particularly where the system 400 is connected to a retractable vehicle step 200 of the type depicted in FIG. 4, such that the output axis G—G is substantially coincident with the second axis B—B. In such an installation of the system 400, minimizing the outside diameter of the output gear 406 can minimize the overall inboard protrusion of the retractable step 200-drive system 400 assembly, or at the very least minimize the inboard protrusion of the upper portions of the step-drive system assembly, nearest the underside of the vehicle 310, where the available space for installation of these components tends to be most restricted. Moreover, whether the drive system 400 is connected such that the output axis G—G is substantially coincident with the second axis B—B or the first axis A—A, a relatively small output gear 406 improves packaging because of the general scarcity of space in the inboard-outboard and vertical directions.

Accordingly, in one embodiment the entire drive system 400 fits within a three-dimensional box-shaped space or "package" (with sides oriented at right angles to each other) of about 7.5 inches, or about 7–9 inches (measured along the axis E—E) by about 3 inches, or about 3–4 inches (along the axis F—F) by about 4 inches, or about 4–5.5 inches (along an axis orthogonal to both axes E—E, F—F). In another embodiment, the entire drive system 400 fits within a two-dimensional rectangular "profile" of about 3 inches, or about 3–4 inches (measured along the axis F—F) by about 4 inches, or about 4–5.5 inches (measured perpendicular to the axis F—F). In still another embodiment, the drive system 400 less the motor assembly 402 (in other words, the gearbox 430 with all components connected thereto or installed therein) fits within such a three-dimensional box-shaped space or "package" of about 4 inches, or about 4–5.5 inches (measured along the axis E—E) by about 2 inches, or about 2–3 inches (along the axis F—F) by about 3.5 inches, or about 3.5–5 inches (along an axis orthogonal to both axes E—E, F—F). In yet another embodiment, the drive system 400 less the motor assembly 402 fits within a two-dimensional rectangular "profile" of about 2 inches, or about 2–3 inches (measured along the axis F—F) by about 3.5 inches, or about 3.5–5 inches (measured perpendicular to the axis F—F).

The gear parameters specified above may be varied in other embodiments. For example, the pinion gear 404 may alternatively have 1, 2, 3, 4, 6, 7, 8 or more teeth, and the number of teeth on the output gear correspondingly varied to achieve the desired gear reduction, which may be 2:1, 3:1, 4:1, 6:1, 7:1 or more. The helix angle of the pinion gear 404 may be varied from the 75-degree angle specified above (as one example, any suitable angle from 45–85 degrees may be employed; other suitable ranges include 60–85 degrees or 70–80 degrees), and the helix angle of the output gear 406 may be selected to complement that of the pinion gear 404. In still other embodiments, the pinion gear 404 and output gear 406 may comprise bevel gears, standard (non-helical) spur gears, a worm-and-worm-gear arrangement, etc., rather than the right-angle helical drive discussed above.

In some embodiments, the drive system 400 is configured to have an output speed (the speed of the output gear 406/output shaft 408) of about 10–25 RPM, or about 15–22 RPM, or about 17.8 RPM when unloaded (e.g., without a retractable vehicle step connected with respect to the output gear 406 or output shaft 408). In other embodiments, the drive system 400 is configured to have an output speed of about 7–22 RPM, about 12–19 RPM or about 15 RPM when deploying a retractable vehicle step (e.g. the step 200 depicted herein) connected with respect to the output gear 406 or output shaft 408. In still other embodiments, the drive system 400 is configured to have an output speed of about 4–19 RPM, about 9–16 RPM or about 11.7 RPM when retracting a retractable vehicle step (e.g. the step 200 depicted herein) connected with respect to the output gear 406 or output shaft 408. Note that when retracting or deploying a retractable vehicle step similar to the step 200 depicted herein, the output speed of the drive system 400 will be equivalent to the angular speed of the first arm 202 and/or second arm 204 as the step 200 deploys or retracts.

In some embodiments, the drive system 400 is configured to move a retractable vehicle step (such as, without limitation, retractable step similar to the step 200 disclosed herein) from the retracted position RP to the deployed position DP in about 0.3–2.0 seconds, or about 0.5–1.0 seconds. In still other embodiments, the drive system 400 is configured to move a retractable vehicle step (such as, without limitation, retractable step similar to the step 200 disclosed herein) from the deployed position DP to the retracted position RP in about 0.6–1.8 seconds, or about 0.8–1.5 seconds, instead of or in addition to the deployment-time capabilities mentioned above.

With further reference to FIGS. 5–10, the drive system 400 may further comprise a rigid gearbox 430, which in turn may further comprise a pinion housing 432 connected to (or integrally formed with) an output housing 434. The pinion housing 432 has a generally cylindrical interior that is substantially centered on and extends along the pinion axis F—F, and the output housing 434 has a generally cylindrical interior that is substantially centered on and extends along the output axis G—G. The pinion and output housings 432, 434 intersect in a manner that permits meshing engagement of the pinion and output gears 404, 406, contained therein, respectively.

The pinion gear 404 is mounted on the drive shaft 414 of the motor assembly and, in the depicted embodiment, forms a number of locking teeth 436 which are received in matching pockets 438 which rotate in concert with the drive shaft 414 under the power of the motor 412. The teeth 436 and pockets 438 coact to substantially prevent relative rotation of the drive shaft 414 and pinion gear 404 when the drive system 400 is in operation. Alternatively, any suitable structure, such as a spline, keyway, etc. may be employed instead of the teeth 436 and pockets 438 to prevent such relative rotation.

At its end opposite the motor assembly 402, the pinion housing 432 forms a bearing pocket 440 which receives an outer race 442a of a pinion bearing 442, while a snap ring 444 retains the bearing 442 in the pocket 440. An inner race 442b of the pinion bearing 442 fits over an axle stub 446 formed on the pinion gear 404, and is secured thereto with a bearing screw 448. A dust cap 450 may be employed to prevent debris from entering the pinion housing 432. In one embodiment, the pinion bearing 442 comprises a radial bearing.

Accordingly, the pinion bearing 442 journals the pinion gear 404 with respect to the pinion housing 432, and coacts with the bearing pocket 440, snap ring 444 and screw 448 to bear any radial (or thrust) loads transmitted through the pinion gear 404 perpendicular to (or along) the pinion axis F—F. The pinion bearing 442, etc. therefore substantially isolate the motor assembly 402 from such radial or thrust loads and reduce the potential for damaging the motor assembly thereby.

The output shaft 408 is journalled to the output housing 434 via first and second output bushings 460, 462, with the first output bushing 460 received in an output opening 464 formed in an end plate 466 connected to the end of the output housing 434. The second output bushing 462 may be received in a similar opening (not shown) at an opposite end of the output housing 434.

In one embodiment, a breakaway member 470 is employed to connect the output gear 406 to the output shaft 408. In the depicted embodiment, the breakaway member 470 comprises a tolerance ring. The breakaway member 470 is disposed between the outside diameter of the output shaft 408 and the inside diameter of the output gear 406, and prevents relative angular motion of the output gear 406 and the output shaft 408, except in response to the application of a breakaway torque to the output gear or the output shaft. Such a breakaway torque may be applied when an obstruction blocks movement of the retractable step 200 while the motor assembly 402 is energized and turning, or when an external force is applied to the retractable vehicle step 200 to urge it toward the retracted or deployed position while the motor assembly 402 is stationary.

Figure 8:
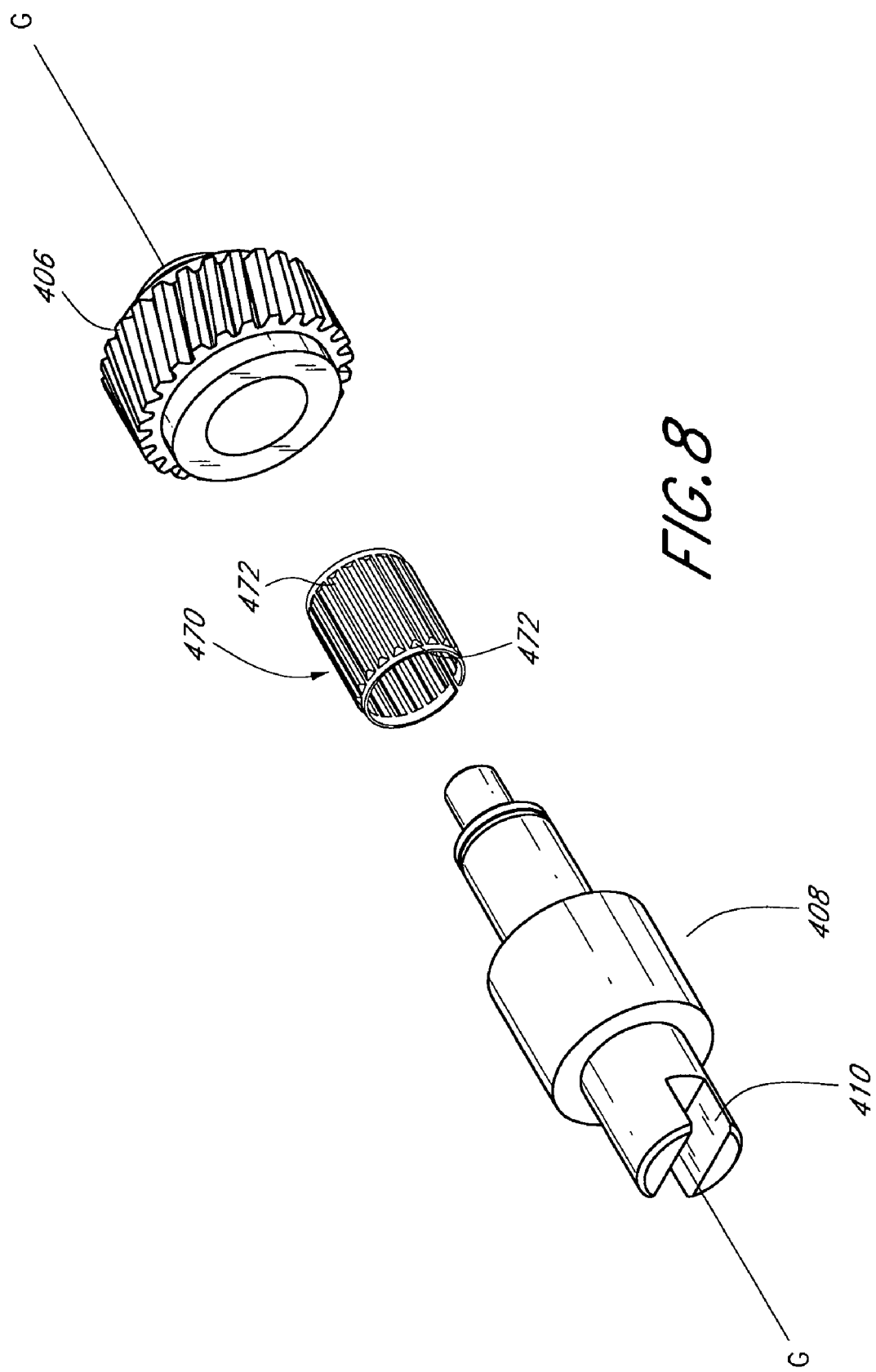
FIG. 8 is a second detail view of the drive system of FIG. 5.
Figure 9:
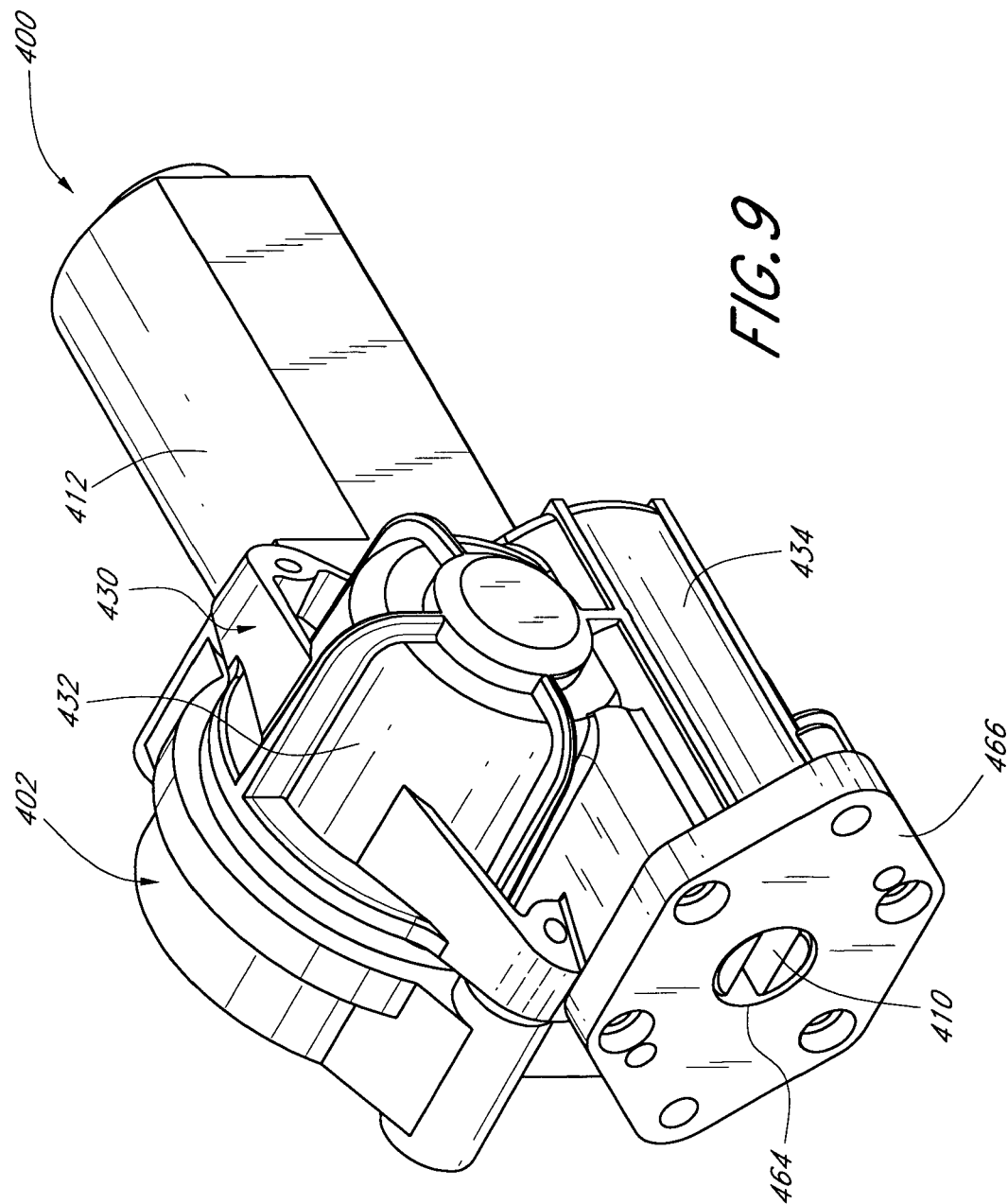
FIG. 9 is a third perspective view of the drive system of FIG. 5.
Figure 10:
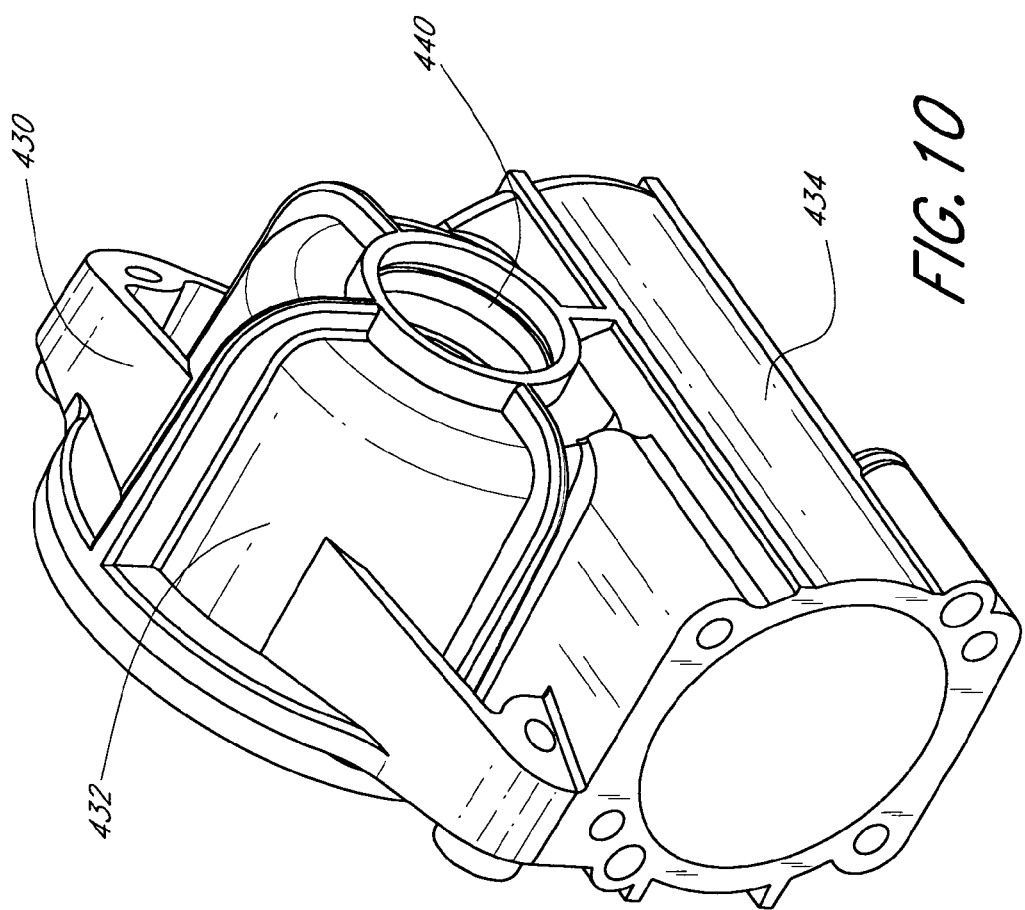
FIG. 10 is a detail view of the gearbox of the drive system of FIG. 5.

FIG. 8 depicts one embodiment of the breakaway member 470 in greater detail. The depicted breakaway member 470 comprises a generally cylindrical spring member which forms a number of longitudinally-extending ridges 472 on its surface. Preferably, the ridges are oriented such that their peaks contact the inside diameter of the output gear 406; more generally, the peaks may be oriented such that they contact whichever of the output gear and output shaft is constructed of a softer material. The inherent resilience of the ridges 472 allows the breakaway member 470 to act as a friction coupling between the output gear 406 and the output shaft 408. Preferably, the breakaway member 470 allows relative rotation of the output gear 406 and the output shaft 408 upon application of a breakaway torque of about 40 foot-pounds to the output gear or the output shaft. One preferred product for use as the breakaway member 470 is a tolerance ring model no. BN, available from USA Tolerance Rings of West Trenton, N.J.

Figure 12:
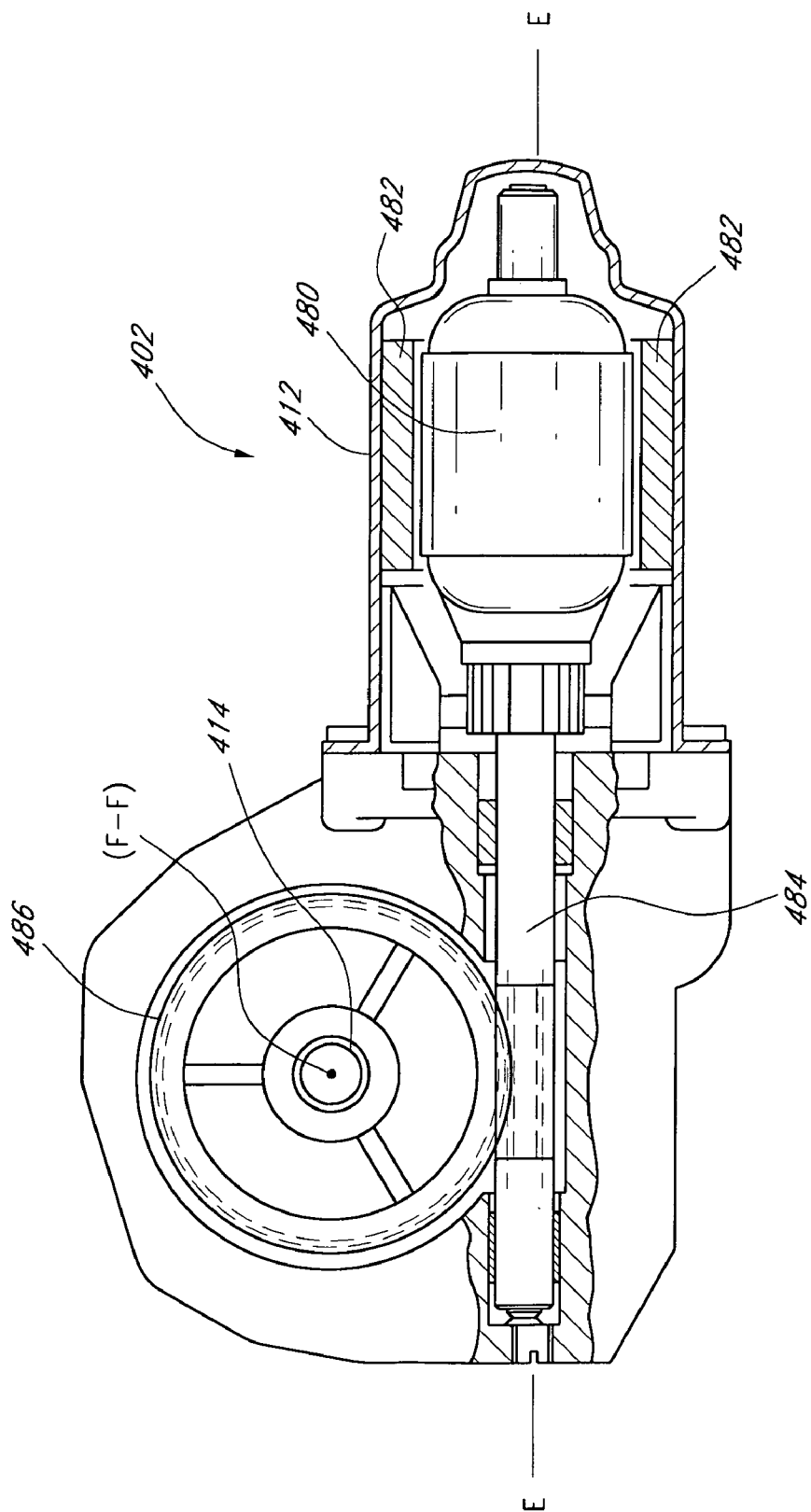
FIG. 12 is a partial sectional view of a motor assembly for use with the drive system of FIG. 5.

FIG. 12 depicts one embodiment of the motor assembly 402 in greater detail. The motor 412 comprises an armature 480 rotatably disposed in a space between magnets 482. A worm 484 extends from one end of the armature 480, and when energized the armature 480 rotates the worm 484 about the armature axis E—E at the same angular speed as the armature 480 itself. The worm 484 meshes with a worm gear 486, which rotates about the pinion axis F—F in concert with the drive shaft 414, which is coupled to the worm gear 486. The drive shaft 414 delivers power to the downstream portions of the drive system 400, as described above. Various embodiments of the motor assembly 402 (including without limitation the embodiment depicted in FIG. 12) may employ a gear reduction of about 20:1–180:1, or about 40:1–80:1, or about 80:1, or about 60:1 between the motor 412 itself (e.g., the armature where the motor 412 comprises an electric motor) and the drive shaft 414 of the motor assembly 402. Accordingly, in the embodiment depicted in FIG. 12 the worm 484 and worm gear 486 achieve a gear reduction as specified above.

Figure 13:
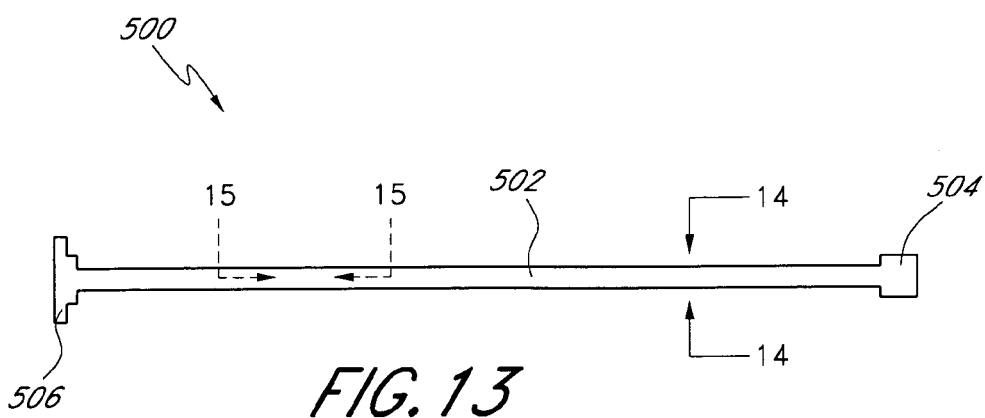
FIG. 13 is schematic view of a fiber optic sensor comprising an optical fiber having transmission properties that vary with pressure applied to the optical fiber.

The retractable vehicle assist may further comprise an anti-pinch/anti-strike system for reducing or preventing injury that might potentially be caused by pinching/striking during retraction of the retractable step. This anti-pinch system may comprise an optical sensor 500 such as a fiber optic sensor as shown in FIG. 13. The fiber optic sensor 500 comprises a fiber optic line 502 optically coupled to a light source 504 and a light sensitive optical detector 506. As illustrated by the cross-sectional view of FIGS. 14 and 15, the fiber optic line 502 comprises an optical fiber comprising a core 508 and a cladding 510. The core 508 is disposed in the cladding 510. The fiber optic line 502 may further comprise an outer protective sheath 512 surrounding the optical fiber.

Preferably, the fiber optic 502 is pressure sensitive. For example, pressure applied to the fiber optic 502 may alter one or more optical properties of the optical fiber that are measurable, for example, with the optical detector 506 optically coupled to the optical fiber. In certain preferred embodiments, the optical fiber 502 has a transmission loss that increases with applied pressure. When pressure is applied to a portion of the optical fiber 502, light escapes from the optical fiber resulting in transmission loss. This transmission loss may be quantified by monitoring the intensity of light propagated down the optical fiber 502 reaching the light sensitive optical detector 506. Pressure applied to the optical fiber 502 that induces transmission loss thereby reduces the optical signal detected by the light sensitive optical detector 506.

Figure 14:
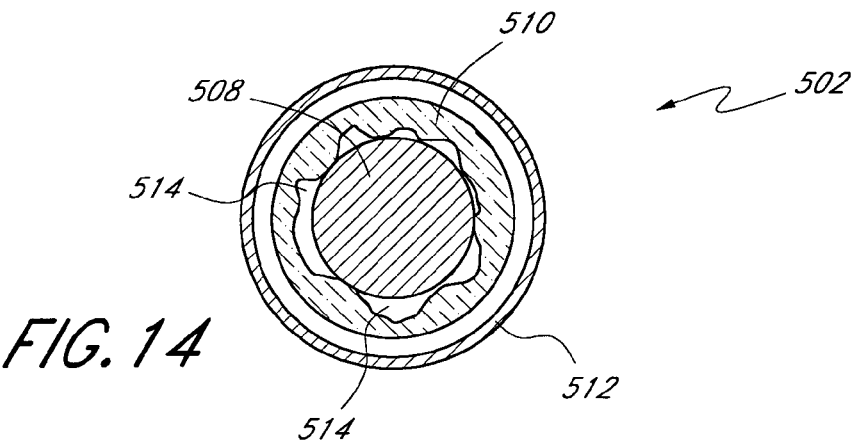
FIG. 14 is a cross-sectional view of the optical fiber of FIG. 13 taken along the line 14—14.
Figure 15:
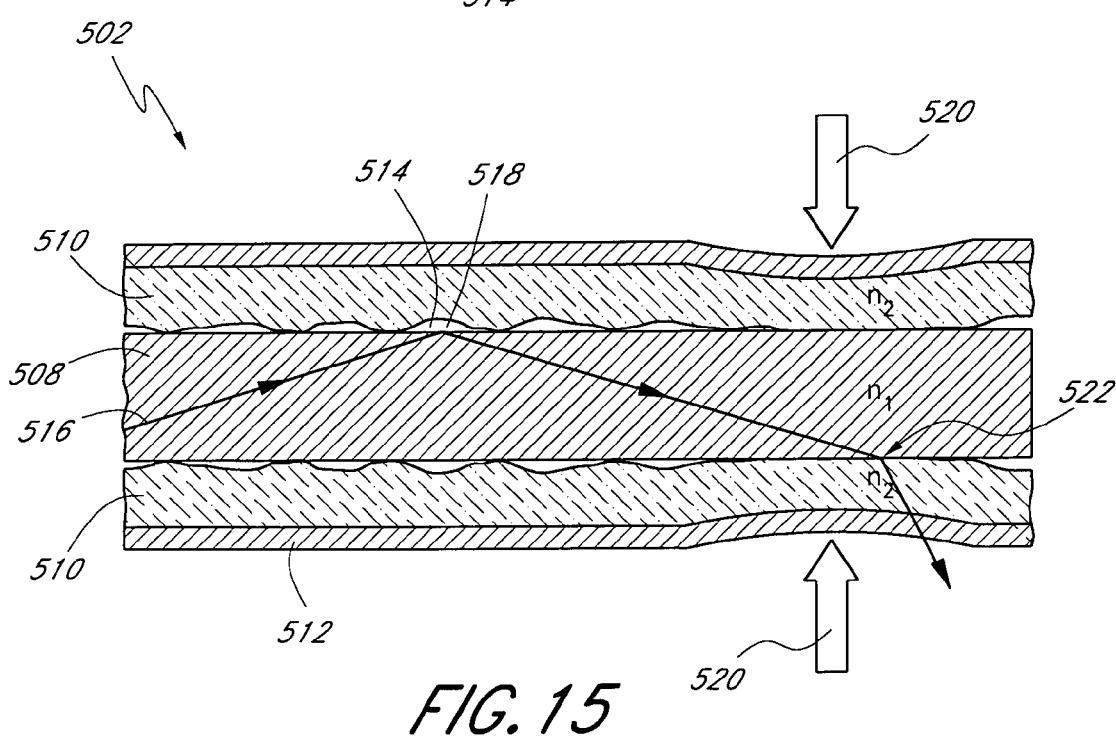
FIG. 15 is a cross-sectional view along a length of optical fiber such as depicted in FIG. 13 taken along the line 15—15 illustrating optical loss induced by applying pressure to the optical fiber.

In the pressure sensitive optical fiber 502 shown in FIGS. 14 and 15, gap regions 514 may be disposed between the core 508 and the cladding 510. The core 508 may comprise a material having a first refractive index, $n_{core}$. The cladding 510 may comprise a material having as second refractive index, $n_{cladding}$. The gap region 514 may be filled with a medium having a third refractive index, $n_{gap}$. In various preferred embodiments, the cladding 510 comprises a flexible resilient material that is deformable and that has memory, such that the cladding substantially returns to the original shape prior to deformation when a deforming force is removed. The cladding 510 may also comprise material having a refractive index greater than or equal to the refractive index of the core 508 (e.g., $n_{core} \leq n_{cladding}$). The medium within the gap regions 514 may have a refractive index smaller than both the refractive index of the core 508 and the cladding 510 (e.g., $n_{gap} < n_{core} \leq n_{cladding}$).

The core 508 may comprise, for example, polymethylmethacrylate (PMMA) or polyurethane as well as other materials. The gap region 514 may comprise an air gap or be filled with other material in other embodiments. The cladding 510 may comprise polyurethane, silicon, polyethylene or rubber such as for example, ethylene-propylene-terpolymer-rubber. Other materials may be employed as well. In various embodiments, the optical fiber 502 may be between about 0.1 to 2.0 meters. Longer or shorter optical fiber 502 may be used in the alternative. The optical fiber core 508 may be, for example, between about 1 millimeter in diameter or larger or smaller in various cases. The optical fiber 502 including the core 508 and the cladding 510 together may be about 1 to 10 millimeters or larger or smaller. Exemplary fiber optic sensors 500 for sensing applied pressure have been developed by Leoni, AG, Nürnberg, Germany.

As shown in FIG. 15, light propagating within the core 508 of the optical fiber 502, represented by a ray 516 is totally internally reflected off of an interface 518 between the core 508 and the gap region 514. For total internal reflection, the ray 516 is incident on this boundary 518 at an angle greater than the critical angle. Total internal reflection is possible because the index of refraction of the core 508 is larger than the index of refraction of the gap region 518 ($n_{gap} < n_{core}$). Such total internal reflection enables a beam of light to be guided by and propagated through the optical fiber 502. The optical fiber 502 shown in FIGS. 14 and 15 includes a large number of such gap regions 514 resulting in total internal reflection and substantially efficient transmission of light down said optical fiber.

Although the light is totally internally reflected at the interface 518, a small portion of electro-magnetic field strength associated with the light incident on the interface, referred to as the evanescent field, penetrates through the interface. This field strength, however, decays exponentially with a short distance into the gap region 514.

Compressive force applied to the optical fiber 502, illustrated by arrows 520, causes the cladding 510 to approach or be pressed against the core 508. The gap regions 514 largely give way bringing the cladding 510 within close proximity to or in physical contact with the core 508 at an optical interface 522. Preferably, the cladding 510 overlaps the evanescent field. The relatively high index cladding 510 proximal to the core-gap interface 522 and to the evanescent field, permits optical energy to be coupled out of the evanescent field into the cladding 510. Total internal reflection at the interface 522 between the core 508 and the gap regions 514 is thereby frustrated by the presence of the higher index cladding medium in close proximity to the core-gap boundary and the evanescent field. Coupling light through the interface 522 and into the cladding 510 causes an overall reduction in the amount of light propagated down the optical fiber 502 as light escapes the core 508 and is lost to the cladding. This transmission loss is produced, in this case, by application of pressure to the optical fiber 502.

Accordingly, light from the light source 504 is preferably coupled into the optical fiber 502. This light is propagated along the optical fiber 502 to the light sensitive optical detector 506, which may measure the intensity of light reaching the optical detector. Without application of compressive force to the optical fiber 502, preferably a substantial amount of the light coupled into the optical fiber is sensed by the optical detector 506. Compression of a portion of the optical fiber 502, such as a result of pinching the fiber optic line causes deformation of the cladding 510 and reduction of the gap regions 514 separating the core 508 and the cladding 510. Optical energy is coupled from the evanescent field and light escapes the core 508 as a result. This optical loss results in an attenuated intensity level measured by the optical detector 506 as less light is successfully transmitted along the optical fiber 502 to the detector.

Figure 16:
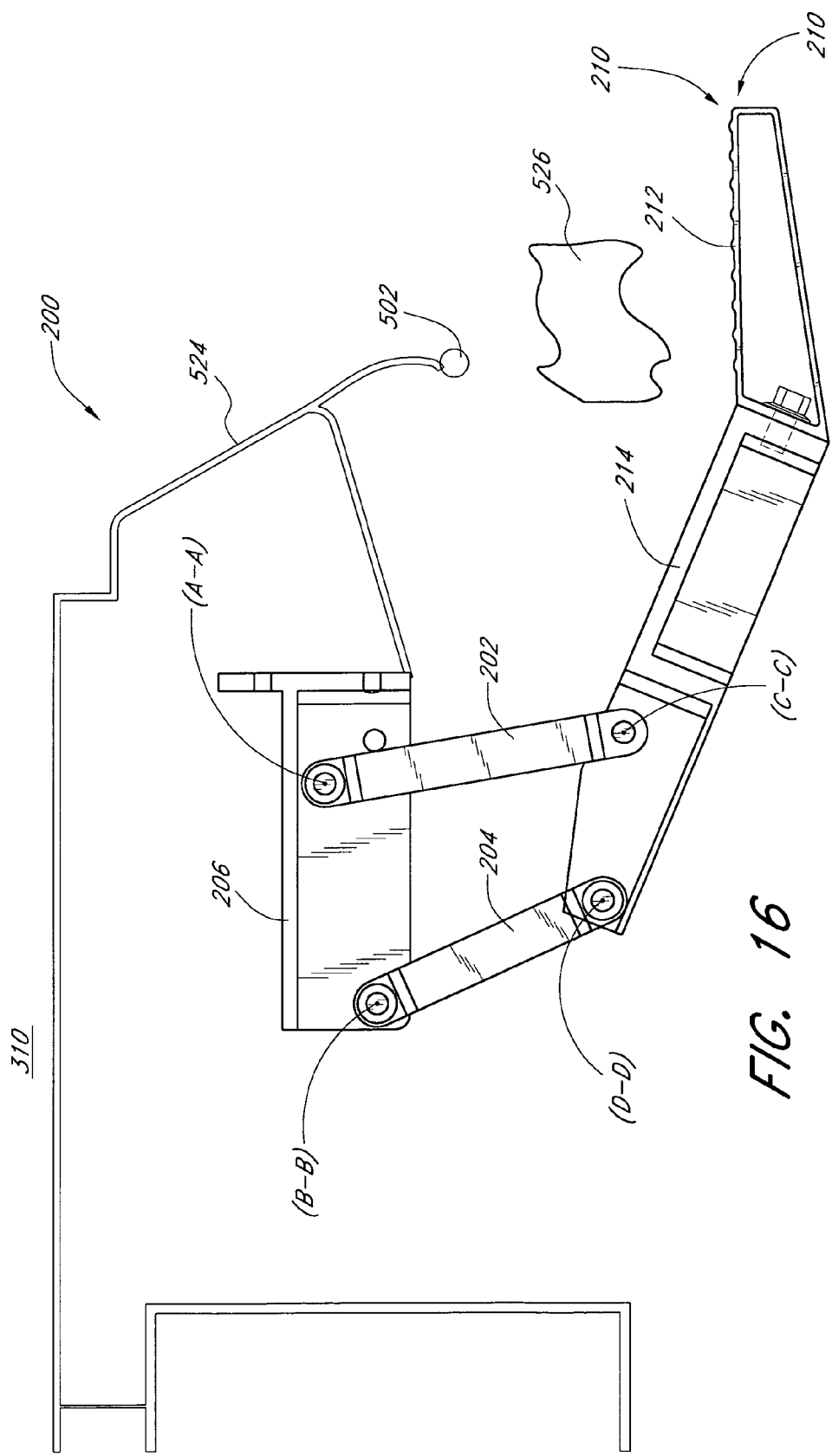
FIG. 16 is a side view of one embodiments of a retractable vehicle step having an anti-pinch sensor such as the fiber optic sensor shown in FIG. 13.

As illustrated in FIG. 16, the optical fiber line 502 may be disposed with respect to a lower portion of the vehicle such as on a lower body portion 524. Preferably, the optical fiber 502 is located such that an object 526 such as a foot pinched by the retracting step member 210 presses against the optical fiber 502. This applied pressure may be sensed by the optical fiber sensor 500. The optical detector 506 may have an electrical output port that is electrically connected, for example, to the motor that drives the step member 210. A signal sent from the detector to a switch controlling the motor may cause the retracting motion of the step to stop. In various embodiments, this signal may possibly trigger the motor to reverse the direction of the step to thereby facilitate release of the object 526. In other embodiments, sensing pressure may activate a braking mechanism and/or a release for disengaging, e.g., the drive or linkage imposing the force to retract the step 200.

Depending on the configuration of the retractable vehicle assist, the optical fiber 502 may be disposed at different locations. Preferably, however, the optical fiber 502 or fibers are positioned on a surface or surfaces that will make contact with an object 526 being pinched by the retracting step 210. One or more optical fiber lengths 502 may be applied to one or more locations. As shown in FIG. 16, the object 526 may, for example, be pinched between the step deck 212 and the lower body panel 524 or, for example, the dust cover. Accordingly, the fiber optic 502 may be connected to the lower body panel 524 or dust cover. Fasteners, adhesives, or other configurations for securing the fiber optic sensor 500 to the vehicle 310 may be used. The fiber optic sensor 500 may be located elsewhere as well. For example, the fiber optic line 502 may be placed on the step deck 212 in certain cases. In various preferred embodiments, the fiber optic line 502 is on the underside of the vehicle and may be on the frame or body of the vehicle or on another auxiliary surface attached to the vehicle. The light source 504 and the optical detector 506 are also preferably secured to the vehicle 310 as well. Electrical power may be supplied to the light source 504 and the detector 506.

Still other configurations of vehicle step assists with corresponding fiber optic sensors 500 appropriately placed are possible. The configurations and designs of the retractable vehicle assist, the placement and design of the fiber optic pressure sensor 500, however, should not be limited to those specifically shown herein. For example, other types of retractable vehicle step assists are described in U.S. Pat. No. 6,641,158 entitled "Retractable Vehicle Step" issued to Horst Leitner on Nov. 4, 2003 and U.S. patent application Ser. No. 10/653,708 entitled "Retractable Vehicle Step" filed Aug. 19, 2003 by Horst Leitner and Anthony Smith, which are incorporated herein by reference in their entirety. These configurations and designs may be employed in whole or in part in conjunction with the anti-pinch systems and pressure sensors. Still other variations are possible.

Figure 17:
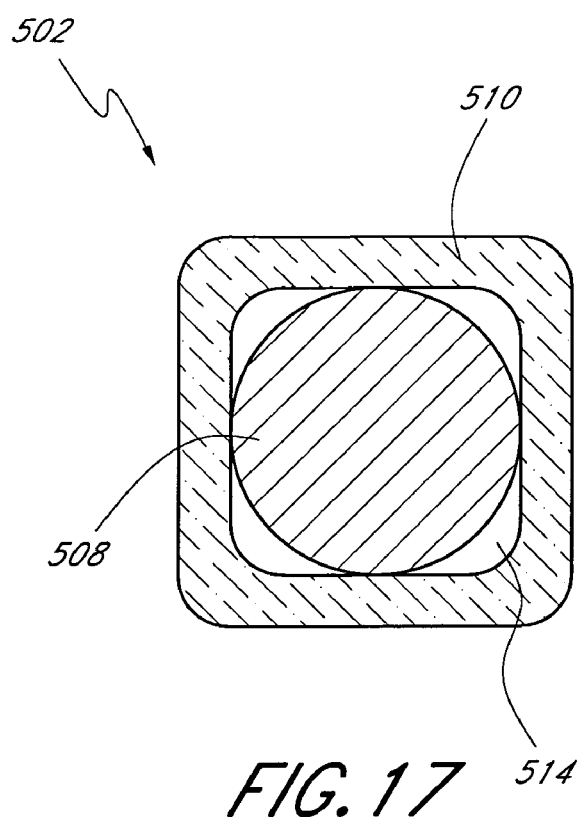
FIG. 17 is a cross-sectional view of an embodiment of an optical fiber having a different cross-sectional geometry for use in a fiber optic pressure sensor.
Figure 18:
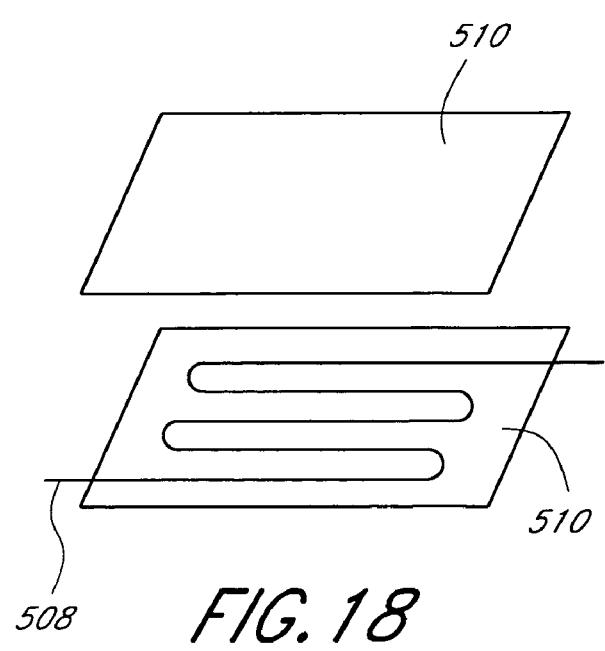
FIG. 18 is a schematic perspective view of another embodiment of a pressure sensitive fiber sensor.

Other fiber optic sensor 500 configurations are also possible. FIG. 17 depicts a cross-sectional view of another embodiment wherein the cladding 510 of the optical fiber 502 has a different cross-sectional geometry. As shown, the gaps 514 between the core 508 and the cladding 510 are created by the cross-sectional shape of the cladding 510 (and the core 508). Still other geometries and configuration are possible. In addition, the optical design may be different. For example, the light source 504 and the light sensitive optical detector 506 may be optically coupled to the same end of the optical fiber 502. A reflective element, disposed proximal to the other end of the optical fiber 502 may be used to return light from the light source along a second pass through the optical fiber 502 back to the detector 506. This reflective element may comprise, for example, a mirrored surface or fiber Bragg reflector. The light source 504 and optical detector 506 may be located proximal to each other (e.g., together with a central housing) and the optical fiber 502 may be looped to return back to the source/detector location. More than one optical fiber 502 may be coupled to a light source 504 or to an optical detector 506. More than one light source 504 or optical detector 506 may be used as well. Also, instead of a substantially cylindrical cladding 510 surrounding the core 508, the cladding may have still other shapes and geometries. In certain embodiments, for example, the cladding 510 may comprise opposed sheets or substantially planar layers or foil above and below the core 508, which may follow a path that is not necessarily straight as shown in FIG. 18.

Other types of pressure sensitive fiber optic and waveguide sensors 500, not necessarily based on coupling optical energy in evanescent fields out into the cladding 510 may be employed. Such sensors 500 may or may not have an optical transmission or transmission loss that is altered by applied compressive or other type of force and that is monitored. Other optical properties of the optical fiber 502 or waveguide or system may be also be altered by application of such tactile stimuli and used to sense. Still other types of optical and non-optical pressure sensors may be employed as well. Optical fiber pressure sensors such as described herein, however, are light, compact, relatively inexpensive, and reliable. Moreover, these optical sensors are sensitive. Such sensors preferably can be configured to detect pinching forces less than 100 Newtons (N), less than about 75 N or less about 50 N. Certain design criteria (e.g., the pinching force on a finger in an electric automobile windows) is about 100 N. Preferably, the sensors employed can detect such low forces and may be even more sensitive.

Although certain embodiments and examples have been described herein, it will be understood by those skilled in the art that many aspects of the devices shown and described in the present disclosure may be differently combined and/or modified to form still further embodiments. Such alternative embodiments of the devices described above and obvious modifications and equivalents thereof are intended to be within the scope of the present disclosure. Thus, it is intended that the scope of the present invention should not be limited by the particular embodiments described above, but should be determined only by a fair reading of the claims that follow.

What is claimed is:

1. A retractable step assist for a vehicle, comprising:
a step member having a step deck with an upper stepping surface, said step deck movable between a retracted position and a deployed position downward and outboard from said retracted position;
an extendable support assembly connectable with respect to an underside of the vehicle so as to extend said step deck downward and outward from the underside of the vehicle in the deployed position;
an electrically activated actuator mechanically connected to said extendible support assembly to automatically position said extendible support assembly and said step deck;
an optical fiber comprising an inner core and an outer cladding, said outer cladding at least partially surrounding said inner core, said optical fiber having transmission properties that vary when pressure is applied to said optical fiber, said optical fiber disposable on a lower body portion of said vehicle;
a light source having an optical output optically connected to said optical fiber so as to couple light output by said light source into said core of said optical fiber such that said light propagates through said optical fiber;
a light sensitive optical detector optically coupled to said core of said optical fiber to measure the intensity of said light from said light source propagating through said optical fiber, said intensity measured by said optical detector varying when pressure is applied to said optical fiber, said optical detector having an electrical output dependent on said measured intensity and indicative of said pressure applied; and
an electrically activated safety electrically connected to said electrical output of said optical detector, said electrically activated safety terminating retracting motion of said step member when said optical fiber senses pressure from an object pinched between said step deck and said lower body portion.

2. The retractable step assist of claim 1, wherein said electrically activated actuator comprises an electrical motor.

3. The retractable step assist of claim 1, wherein said optical fiber is disposable on a lower body panel of said vehicle.

4. The retractable step assist of claim 1, wherein said inner core of said optical fiber comprises material having a refractive index and said outer cladding of said optical fiber comprises a material having a refractive index, said refractive index of said outer cladding being at least a large as said refractive index of said inner core.

5. The retractable step assist of claim 4, wherein low refractive index gap regions separate said inner cladding from said outer core, said low refractive region gap regions having a lower refractive index than the refractive indices said cladding and said core.

6. The retractable step assist of claim 5, wherein said cladding is resilient such that pressure forces portions of said outer cladding separated from said inner core by gaps to contact said inner core permitting light to escape from the core.

7. The retractable step assist of claim 6, wherein said outer cladding comprises material selected from the group consisting essentially of polyurethane, silicon, polyethylene, rubber, and ethylene-propylene-terpolymer-rubber.

8. The retractable step assist of claim 7, wherein said inner core comprises material selected from the group consisting essentially of polymethylmethacrylate (PMMA) and polyurethane.

9. The retractable step assist of claim 6, wherein said inner core comprises polymethylmethacrylate (PMMA).

10. The retractable step assist of claim 9, wherein said outer cladding comprises polyethylene foam foil.

11. The retractable step assist of claim 1, wherein air gaps separate said outer cladding from said core and said cladding is resilient such that pressure forces portions of said cladding separated from said inner core by air gaps to approach said inner core permitting light to escape from the core.

12. The retractable step assist of claim 11, wherein said core comprises material having a refractive index and said cladding comprises a material having a refractive index, said refractive index of said cladding being larger than said refractive index of said core.

13. The retractable step assist of claim 1, wherein said optical fiber further comprises a protective sheath over said outer cladding.

14. The retractable step assist of claim 1, wherein said light source is selected from the group consisting of a light emitting diode and a laser diode.

15. The retractable step assist of claim 1, wherein said light sensitive optical detector comprise a photodiode.

16. The retractable step assist of claim 1, wherein said electrically activated safety comprises an electrical switch electrically connected to said electrically activated actuator to prevent movement of step assembly.

17. The retractable step assist of claim 1, wherein said electrically activated safety comprises an electrical switch electrically connected to said electrically activated actuator to reverse movement of step assembly.

18. The retractable step assist of claim 1, wherein said electrically activated safety comprises a brake to seize movement of step assembly.

19. The retractable step assist of claim 1, wherein said electrically activated safety comprises a release to disengage a driving retracting force on the step member.

20. The retractable vehicle step assist of claim 1, further comprising a first support arm and said second support arm connectable with respect to an underside of a vehicle so as to be pivotable about a first axis oriented generally parallel to the ground and a second axis oriented generally parallel to the ground, respectively, said first support arm and said second support arm allowing said step member to move between a retracted position and a deployed position downward and outboard from said retracted position.

21. The retractable vehicle step assist of claim 20, wherein said first support arm and said second support arm connected to a step member support bracket opposite said stepping deck so that said first support arm and said second support arm are pivotable with respect to said step member about a third axis and a fourth axis, respectively, said fourth axis located inboard from said third axis.

22. The retractable vehicle step assist of claim 21, wherein said first axis is spaced from said third axis by a first distance, said second axis is spaced from said fourth axis by a second distance, said first axis is spaced from said second axis by a third distance, and said third axis is spaced from said fourth axis by a fourth distance, as said step assist is viewed in a plane perpendicular to said first axis, said first distance and said second distance are unequal, and said third distance and said fourth distance are unequal.

23. A retractable vehicle step assist, comprising:
a first support arm;
a second support arm;
said first support arm and said second support arm connectable with respect to an underside of a vehicle so as to be pivotable about a first axis oriented generally parallel to the ground and a second axis oriented generally parallel to the ground, respectively;
a step member having an upper stepping surface, said first support arm and said second support arm connected to said step member so that said first support arm and said second support arm are pivotable with respect to said step member about a third axis and a fourth axis, respectively, said fourth axis located inboard from said third axis;
said first support arm and said second support arm allowing said step member to move between a retracted position and a deployed position downward and outboard from said retracted position, at least a portion of said upper stepping surface moves upward as said step member moves from said retracted position to said deployed position;
a fiber optic sensor sensitive to pressure, said fiber optic sensor at least partly disposable in a location of said vehicle upward and inboard from said extended position such that an object pinched by said retracting step member is sensed by said fiber optic sensor, said fiber optic sensor comprising:
an optical fiber line comprising a core and a cladding, said optical fiber having a transmission loss increasing with pressure applied to said optical fiber;
a light source optically coupled to said optical fiber core to introduce light into said optical fiber, said light inserted in said core propagating along said optical fiber; and
a light sensitive optical detector optically coupled to said optical fiber core to sense said light propagating within said core of said optical fiber, said light sensitive optical detector having an electrical output port outputting a signal determined in part by said optical transmission loss of said optical fiber; and
a safety system comprising an electrical switch having an electrical input port connected to said electrical output port of said light sensitive optical detector of said fiber optic sensor, said safety system terminating retraction of said step member when an object is pinched by said retracting step member causing said object to apply pressure to said fiber optic line that introduces transmission loss sensed by said light sensitive optical detector and communicated electronically to said safety system.

24. The retractable vehicle step assist of claim 23, wherein said optical fiber is disposable on a lower body panel of said vehicle.

25. The retractable vehicle step assist of claim 23, wherein said core comprises material having a refractive index and said cladding comprises a material having a refractive index, said refractive index of said cladding being at least as large as said refractive index of said core.

26. The retractable vehicle step assist of claim 25, wherein low refractive index gap regions separate said cladding from said core, said low refractive region gap regions having a lower refractive index than said cladding and said core.

27. The retractable vehicle step assist of claim 26, wherein said cladding is resilient such that pressure forces portions of said cladding separated from said inner core by gaps to approach said inner core permitting light to escape from the core.

28. The retractable step assist of claim 23, wherein said optical fiber further comprises a protective sheath over said cladding.

29. The retractable vehicle step assist of claim 23, wherein said light source is selected from the group consisting of a light emitting diode and a laser diode.

30. The retractable vehicle step assist of claim 23, wherein said light sensitive optical detector comprise a photodiode.

31. The retractable vehicle step assist of claim 23, wherein said electrical switch is electrically connected to drive electronics for driving said step member and switching off movement of said step member to prevent retraction.

32. The retractable vehicle step assist of claim 23, wherein said electrical switch is electrically connected to drive electronics for driving said step member in a reverse direction and said electrical switch upon activation reverses retraction of said step assembly.

33. The retractable vehicle step assist of claim 23, wherein said electrically activated safety comprises a brake to seize movement of step assembly.

34. The retractable vehicle step assist of claim 23, wherein said electrically activated safety comprises a release for disengaging a driving force on said step member.

35. A retractable step assist for a vehicle, comprising:
a step member having a step deck with an upper stepping surface, said step deck movable between a retracted position and a deployed position downward and outboard from said retracted position;
an extendable support assembly connectable with respect to an underside of the vehicles so as to extend said step deck downward and outward from the underside of the vehicle in the deployed position;
an actuator mechanically connected to said extendible support assembly to position said extendible support assembly and said step deck;
an optical fiber comprising an inner core and an outer cladding at least partially surrounding said inner core, said optical fiber having optical properties that vary when pressure is applied to said optical fiber, said optical fiber disposable on a lower body portion of said vehicle;
a light source having an optical output optically connected to said optical fiber so as to couple an optical signal into said core of said optical fiber such that said optical signal propagates through said optical fiber;
a light sensitive optical detector optically coupled to said core of said optical fiber to sense said optical signal propagating through said optical fiber, said optical signal measured by said optical detector varying when pressure is applied to said optical fiber, said optical detector having an output dependent on said optical signal measured and indicative of said pressure applied; and
a safety triggered by a signal from said optical detector, said safety configured to terminate retraction of said step member when said optical fiber senses pressure from an object pinched between said step deck and said lower body portion.

36. A retractable step assist of claim 35, wherein as actuator comprises an electrically activated actuator.

37. A retractable step assist of claim 36, wherein as electrically activated mechanical actuator comprises an electrical motor.

38. A retractable step assist of claim 35, wherein said output of said optical detector comprises an electrical output port outputting an electrical signal.

39. A retractable step assist of claim 38, wherein said safety comprises an electronically activated safety having an electrical input port electrically coupled to said electrical output port of said optical detector to receive said electrical signal from said electrical output port of said optical detector.

40. A method of reducing injury caused by retraction of a retractable step in a retractable vehicle step assist, said method comprising:
propagating light through an optical fiber disposed with respect to said retracting step to be at least partially compressed when an object is contacted by retraction of said retractable step in a vehicle step assist, said optical fiber having optical properties that are altered when said optical fiber is compressed;
detecting said light propagated through said optical fiber;
determining whether said optical fiber is compressed based on said variation in said optical properties of said optical fiber; and
terminating retraction of said retractable step upon compression of said optical fiber.

41. The method of claim 40, wherein transmission loss of said optical fiber increases with compression of said optical fiber and said compression of said optical fiber is determined by measuring intensity of light propagated through said optical fiber.

42. The method of claim 40, further comprising reversing movement of said retractable step upon sensing compression of said optical fiber.

43. The method of claim 40, wherein retraction is terminated upon application of about 100 Newton compressive force applied to said optical fiber.

44. An apparatus for reducing injury caused by retraction of a retractable step in a retractable vehicle step assist, said apparatus comprising:
an optical fiber disposed with respect to said retracting step to be at least partially compressed when an object is contacted by retraction of said retractable step in said vehicle step assist, said optical fiber having optical properties that are altered when said optical fiber is compressed;
a detection system comprising an optical detector disposed to receive an optical signal from said optical fiber, said detection system adapted to determine whether said optical fiber is compressed based on said variation in said optical properties of said optical fiber; and control electronics adapted to terminate retraction of said retractable step upon compression of said optical fiber.

45. The apparatus of claim 44, wherein transmission loss of said optical fiber increases with compression of said optical fiber and compression of said optical fiber is determinable by measuring intensity of light propagated through said optical fiber.

46. The apparatus of claim 44, wherein said control electronics are further adapted to reverse movement of said retractable step upon sensing compression of said optical fiber.

47. The apparatus of claim 44, wherein retraction is terminated upon application of about 100 Newton compressive force applied to said optical fiber.

48. The apparatus of claim 44, wherein said retractable step comprises:

a step member having a step deck with an upper stepping surface, said step deck movable between a retracted position and a deployed position downward and outboard from said retracted position;

an extendable support assembly connectable with respect to an underside of the vehicles so as to extend said step deck downward and outward from the underside of the vehicle in the deployed position;

an actuator mechanically connected to said extendible support assembly to position said extendible support assembly and said step deck.

* * * * *